May 18, 1937.  E. W. LARSEN  2,080,665

POWER TRANSMITTING MECHANISM

Filed May 3, 1933

INVENTOR
E. W. LARSEN
BY H. A. Whitehorn
ATTORNEY

Patented May 18, 1937

2,080,665

UNITED STATES PATENT OFFICE 2,080,665

POWER TRANSMITTING MECHANISM

Einer W. Larsen, Chicago, Ill., assignor to Western Electric Company, Incorporated, New York, N. Y., a corporation of New York Application May 3, 1933, Serial No. 669,153

9 Claims. (Cl. 74—33)

This invention relates to a power transmitting mechanism and more particularly to a mechanism which is adapted for driving the distributing apparatus of a winding machine.

In strand distributors for winding machines, provision is frequently necessary of mechanism for adjustment of the rate of motion of the distributor in accordance with the size of the strands being wound, as well as mechanism for driving the distributor in timed relation to the winding arbor and mechanism for reversing the motion of the distributor. The use of an ordinary change gear mechanism increases the complexity of a mechanism already somewhat complex, thus increasing the danger that the driven member will not run faithfully in synchronism with the driving member, as well as being a somewhat cumbersome method of changing the speed ratio. There are other applications also for an easily adjustable gear ratio in which back lash or loose motion is reduced to a minimum.

It is an object of the invention to provide a power transmitting mechanism in which the ratio of motion between a driving and driven member may be easily adjusted and also one in which the desired ratio will not be subject to undesirable fluctuations.

In one embodiment of the invention a power transmitting mechanism comprises a driven rotary member, which in turn drives a distributor through a reversing mechanism, and which is driven by a plurality of successively actuated rotary clutch members. The actuating mechanism for the respective clutch members comprises a flexible strip which engages the periphery of the corresponding clutch member and which is given its actuating motion by a pair of interconnected adjustable stroke levers oscillated by a respective cam on a driven shaft. The design and timing of the cams are such that if the drive shaft is rotated at a uniform rate the corresponding clutches will be driven at uniform speed during successive, slightly overlapping periods of time.

Other objects and advantages will be apparent from the following detailed description taken in conjunction with the accompanying drawing, wherein Fig. 1 is a vertical sectional view of the apparatus;

Figure 1:
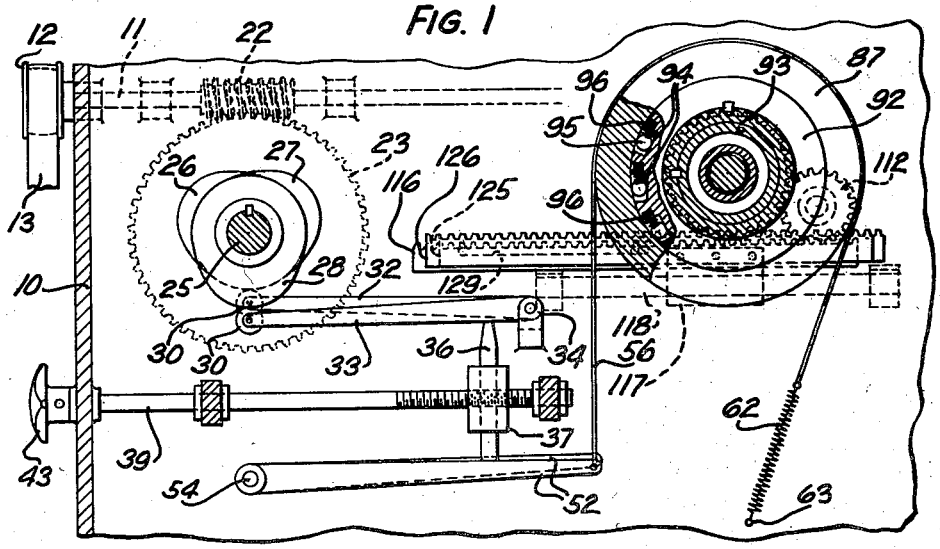

Referring now to the drawing, wherein like reference numerals designate similar elements throughout the various views, reference numeral 10 designates a housing mounted upon a suitable support and having a drive shaft 11 journaled in suitable bearings carried thereby.

The outer end of the drive shaft 11, that is, the end at the left (Fig. 1), has a pulley 12 mounted thereupon for receiving a belt 13 from a motor or other suitable power means (not shown) for rotating the drive shaft 11 continuously in one direction. The other or right end of the drive shaft 11 is provided with a chuck 15 for receiving one end of a core or arbor 16 upon which a coil is to be wound. The other end of the core 16 is receivable in a chuck 17 disposed in general alignment with the chuck 15 and rotatably journaled in a bearing 18 which is adjustably mounted on the housing 10 in any suitable manner (not shown).

A worm 22 is fixed to the shaft 11 intermediate its ends and interengages a worm gear 23. The worm gear 23 is keyed to one end of a cam shaft 25, which is journaled in bearings and has fixedly mounted thereon uniform rise cams 26, 27 and 28. These cams are so arranged that their lowest points are 120° from each other and the rise of each cam takes place over a distance of 130°, the rise overlap of each cam being 10°. Disposed in engagement with the cams 26, 27 and 28 are rollers 30 rotatably carried by adjacent ends of cam levers 31, 32 and 33, respectively. The opposite ends of the cam levers 31, 32 and 33 are pivotally mounted at 34, the lower surfaces of the cam levers being substantially straight as shown in Fig. 1 for a purpose hereinafter described.

An actuating plunger 36 is disposed beneath each of the cam levers 31, 32 and 33 and has its upper end disposed in engagement with the lower surface of the cam levers. The plungers 36 are slidable vertically in apertures of a bracket 37, which is slidable on a rod 38 and connected by means of threads to an adjusting shaft 39. The adjusting shaft 39 is rotatably supported in bearings and extends longitudinally through the housing 10 where it carries a handwheel 43 upon the outer end thereof for rotating the adjusting shaft and causing movement of the plungers 36 relative to the cam levers and clutch actuating arms 52 upon which the plungers rest.

The clutch actuating arms 52 are pivotally supported at their left ends, as indicated at 54, while the other ends thereof are secured to the adjacent ends of suitable clutch actuating means, such as bands or friction strips 56. The friction strips 56 extend upwardly and over clutch units indicated generally at 60 and from the clutch units to the upper ends of springs 62 where they are secured, the lower ends of the springs being secured to a pin 63.

The clutch members 60 are composed of annular outer clutch members 85, 86 and 87 around which the friction strips extend to operatively connect the outer clutch members to their respective actuating arms 52. Inner clutch members 90, 91 and 92 are fixed to a sleeve 93 and have recesses 94 (Fig. 1) disposed at equally spaced positions in their peripheries, the inner surfaces of the recesses being tapered in like directions with respect to their radial center lines. Clutch rollers 95 are disposed in the recesses 94 and are normally urged toward the smaller ends of the recesses and in engagement with the inner periphery of their respective outer clutch members by springs 96.

The sleeve 93 is mounted upon bearings disposed concentric with a hollow shaft 99 and has slidably disposed in and keyed to one end thereof a collar 100, which carries on its inner surface tapered outer clutch elements or surfaces 101 and 102. The collar 100 is grooved at 103 to receive rollers of a yoke 104, which is actuated by any suitable means (not shown) for sliding the collar in an axial direction. The outer clutch element 101 is positioned to engage an inner clutch element 105 which is fixed to the hollow shaft 99 while the outer clutch element 102 is arranged to engage an inner clutch element 106, the latter being fixedly mounted upon a solid shaft 107. The shaft 107 and the hollow shaft 99 extend through the sleeve 93 carrying the clutch units 60, the shaft 107 being journaled in suitable bearings (not shown) for supporting the entire clutch assembly and rotatably mounted in the hollow shaft 99. A gear 110 is keyed to the hollow shaft 99 at the outer end thereof and a gear 111 of equal diameter is secured to the shaft 107 adjacent the gear 110.

The gear 111 is disposed in mesh with an idler gear 112 and the latter is in mesh with a rack 116. The rack 116 is fixed to a material guide or distributor carriage 117 (Figs. 2 and 3), which is slidably mounted upon a supporting bar 118 and held against rotation by an outwardly projection arm 119 slidable in a slot 120. The outer end of the arm 119 rotatably supports a sheave 121 over which material 122, such as wire, passes from a supply spool 123 to the core 16. The gear 110 interengages a rack 125 which is also fixed to the carriage 117 (Fig. 3) and has an auxiliary rack 126 positioned adjacent thereto and in engagement with the gear 110 for eliminating back lash in the connection between the rack 125 and gear 110. A pin 128 carried by the rack 126 extends through and is movable in an elongated slot 129 in the rack 125. A spring 130, having one end secured to the pin 128 and the other end secured to a pin 131 carried by the rack 126, urges the racks in opposite directions relative to each other to form a tight connection between the rack 125 and the gear 110 and eliminate back lash. In practice a similar arrangement may be employed for eliminating back lash in the connection between gear 112 and the rack 116, but this has been omitted for the purpose of simplifying the drawing.

Figure 2:
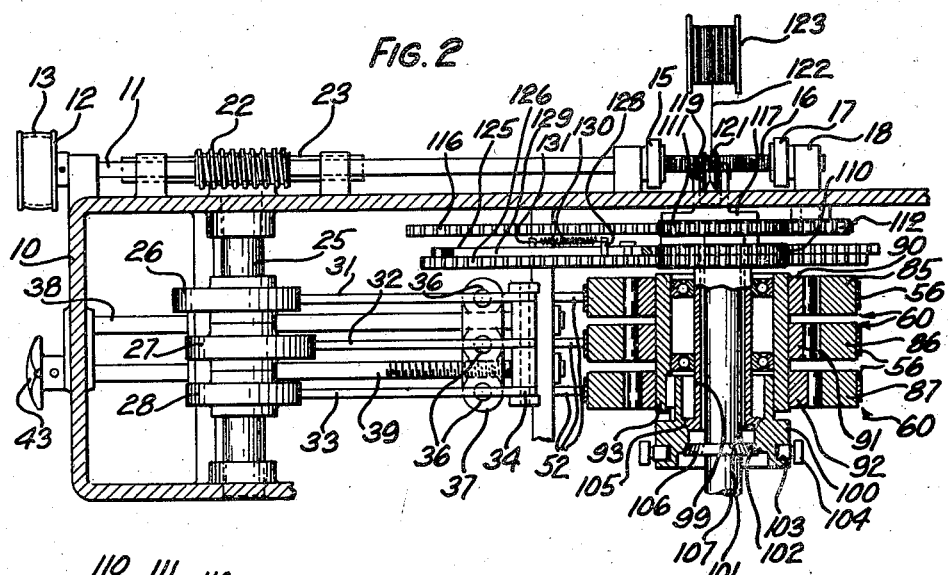
Fig. 2 is a horizontal sectional view of the apparatus.
Figure 3:
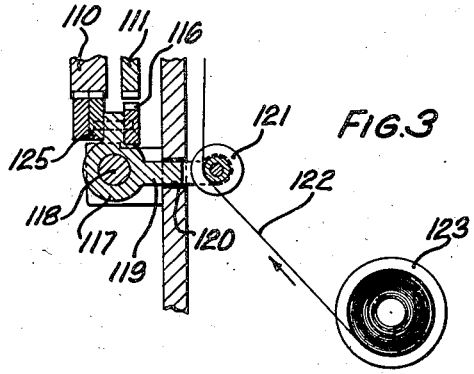
Fig. 3 is a fragmentary sectional view of a portion of the apparatus.

When the machine is in operation, the chuck 15 continuously rotates the core 16 through the continuous rotation of the shaft 11. The end of the wire 122 is, of course, fixed to the core 16 while the machine is at rest. During the continuous rotation of the shaft 11, a rotary movement is imparted to the cams 26, 27 and 28, which in their proper order move their respective cam levers 31, 32 and 33 downwardly about their pivots 34 to impart movement to the clutch actuating arms 52. In following through one cycle of rotation of one of the cams, for example, cam 28, let it be assumed that the low point of the cam is in engagement with the cam roller 30 of the cam lever 33. As the high point of the cam moves toward and into engagement with the roller 30 of the cam lever 33, the cam lever is moved downwardly about its pivot 34, moving with it its respective plunger 36, through which movement is imparted to the clutch actuating lever 52 which it engages. The movement of the clutch actuating lever is downwardly about its pivot 54 and this movement moves the friction strip 56 downwardly against the tension of its respective spring 62, imparting a predetermined rotary movement to the outer clutch member 87, moving this clutch member in a counterclockwise direction, viewing Fig. 1. The movement of the outer clutch member 87 in a counterclockwise direction moves the inner clutch member 92 in the same direction due to the frictional connection between these clutch members caused by the spring pressed rollers 95. The inner clutch member 92, being fixed to the sleeve 93, rotates the collar 100 in a counterclockwise direction; and while the outer clutch element 101 is in engagement with the inner clutch element 105, as shown in Fig. 2, movement will be imparted through these clutch elements, and through the hollow shaft 99 to the gear 110. Rotation of the gear 110 in a counterclockwise direction will cause movement to the right of the racks 125 and 126 and the distributor carriage 117, thus causing a similar movement of the sheave 121 and the wire 122 to guide the wire at a predetermined speed to the right as it is being wound upon the core 16.

When the high point of the cam 28 is moved into engagement with the roller 30 of the cam lever 33, the cam 26 has begun its operation of the cam lever 31 in view of the fact that the rise of the cam 26 has moved into engagement with the roller 30 of the cam lever 31. Therefore, the cam 26, through the cam lever 31, its respective actuating plunger 36, clutch arm 52, and band 56 continues the movement of the distributor carriage 117 to the right at the same predetermined speed through the counterclockwise rotation of the outer clutch member 85, and the inner clutch member 90 which is secured to the sleeve 93. The cam 27 is similarly arranged to continue the operation just before the high point of the cam 26 is moved into engagement with the roller 30 of the cam lever 31. As described in the foregoing, the rise of each cam takes place over a distance of 130°, giving a rise overlap for each cam of 10°, so that the subsequent cam will take up the operation before the previous cam completes the operative portion of its cycle, resulting in a continuous rotation of the sleeve 93 and the elements actuated by its rotation, which actuation carries through to the distributor carriage 117.

As the high point of each cam passes beyond its respective roller 30, the cam lever associated therewith is moved upwardly by one of the springs 62, pulling upon the friction strip 56 connected thereto to move the clutch actuating lever, with which it is associated, upwardly, moving its actuating plunger 36 upwardly and thus moving the adjacent cam actuating lever upwardly so that the roller 30 thereof will continue to engage its respective cam during the approach of the low point thereof. During the return of these elements to what might be termed their normal or inoperative position, the outer clutch member, for example the outer clutch member 87, will be moved in a clockwise direction relative to the inner clutch member, this being permitted by the clutch rollers 95 rolling toward the larger ends of their respective recesses 94 and out of locking or wedging positions due to their engagement with the inner peripheral surface of the outer clutch member. The inner clutch member 92 is, of course, continuously rotated in a counter-clockwise direction in that it is fixed to the sleeve 93 and while the outer clutch member 87 is being returned to its normal or inoperative position ready to take up the operation in its turn the inner clutch member continues its rotation, it being driven in turn by the other inner clutch members 91 and 93.

The cams 26, 27 and 28 being identical in general contour and having their high points equally spaced bring about, through the clutch units 60 a continuous uniform rotation of the sleeve 93 in a counterclockwise direction, imparting a continuous movement to the right of the distributor carriage 117 when the clutch elements 101 and 105 are engaged, this movement of the distributor carriage being at a predetermined constant rate of speed to uniformly distribute the wire 122 upon the core 16.

Any conventional means or system may be employed to actuate the yoke 104 for moving the outer clutch element 101 out of engagement with the inner clutch element 105 and move the outer clutch element 102 into engagement with the inner clutch element 106 to disconnect the hollow shaft 99 from the sleeve 93 and to connect the solid shaft 107 to the sleeve when the carriage 117 has moved a desired distance to the right and to cause a movement of the carriage to the left. The action of the cam levers 31, 32, and 33 through the rotation of their respective cams, continues the actuation of the clutch units 60 rotating the shaft 107 in a counterclockwise direction with the gear 111, rotating the idler gear 112 in a clockwise direction, thus moving the rack 116 with the carriage 117 to the left at the same rate of speed at which the carriage was moved to the right.

The rate of movement of the carriage may be varied by rotating the handwheel 43 to move the bracket 37 with the actuating plungers longitudinally of the cam levers 31, 32 and 33 and their respective clutch actuating arms 52, to vary the effective stroke of each plunger. It will be observed that by moving the plungers 36 to the left along the straight under surfaces of the cam levers and the straight upper surfaces of the clutch actuating arms, the effective movement of each cam lever and clutch actuating arm will be increased, increasing the distance of rotation of the outer clutch members 85, 86 and 87, and thus increasing the speed of rotation of the hollow shaft 99 or the solid shaft 107 through their connections with the outer clutch members. A movement to the right of the actuating plungers 36 will in a similar manner decrease the speed of rotation of the shafts 99 and 107 and by varying the speed of rotation of these shafts the speed of movement of the carriage 117 is varied. One important feature of the speed varying means is that it may be brought about while the machine is in operation and furthermore exceedingly fine adjustments may be made to compensate for the fine variations in the sizes of the material which may be distributed.

Even though the embodiments of the invention herein described illustrate the power transmitting mechanism as being employed to actuate a distributing means, it should be understood that various modifications may be made therein without departing from the spirit and scope of the present invention.

What is claimed is:

1. In a transmission mechanism, a driving shaft, a driven shaft, a cam on the driving shaft, an oscillatory cam lever operatively engaging said cam, a second lever spaced from and substantially parallel to the cam lever and having its free end extending in a direction opposite to that of the cam lever, a plunger extending between and slidably engaging said levers for transmitting the motion from said cam lever to said second lever, and means operatively connecting said second lever to said driven shaft for converting the oscillatory movement of the said second lever into a rotary motion of said driven shaft.

2. In a transmission mechanism, a driving shaft, a pair of spaced and substantially parallel levers having their free ends extending in opposite directions, a cam on said shaft for oscillating one of said levers, a plunger extending between and slidably engaging said levers through which the movement of the cam actuated lever imparts a variable movement to the other lever, and means for sliding said plunger longitudinally of said levers.

3. In a transmission mechanism, a driving shaft, a plurality of pairs of spaced and substantially parallel levers having their free ends extending in opposite directions, a separate cam on said driving shaft for actuating one lever of each pair, a separate plunger extending between and adjustable lengthwise of the levers of each pair through which each cam actuated lever imparts a variable movement to the other lever of the pair, and common means for adjusting all of the plungers simultaneously.

4. In a transmission mechanism, a shaft, a plurality of pulleys on said shaft, a one-way clutch separately connecting each pulley to said shaft, a plurality of flexible elements, one in driving engagement with each pulley, and means for intermittently moving said elements in overlapping succession in the same direction to drive said shaft continuously at a uniform speed.

5. In a transmission mechanism, a shaft, a plurality of pulleys on said shaft, a one-way clutch separately connecting each pulley to said shaft, a plurality of flexible elements, one in driving engagement with each pulley, a plurality of levers, one connected to each flexible element, and means for oscillating said levers in overlapping succession to drive said shaft continuously at a uniform speed.

6. In a transmission mechanism, a shaft, a plurality of pulleys on said shaft, a one-way clutch separately connecting each pulley to said shaft, a plurality of flexible elements, one in driving engagement with each pulley, a plurality of levers, one connected to each flexible element, means for oscillating said levers in overlapping succession to drive said shaft continuously at a uniform speed, and means for altering the movement of said levers to alter the speed of said shaft.

7. In a transmission mechanism, a driving shaft, a driven shaft, a plurality of pulleys on said shaft, a one-way clutch separately connecting each pulley to said shaft, a plurality of flexible elements, one in driving engagement with each pulley, a plurality of levers, one connected to each flexible element, and cams on said driving shaft for oscillating said levers in overlapping succession to drive said driven shaft continuously at a uniform speed.

8. In a transmission mechanism, a driving shaft, a driven shaft, a plurality of clutches separately connected to said driven shaft to drive it in one direction, a plurality of flexible elements, one in driving engagement with each clutch, a plurality of oscillatory clutch actuating members, each fulcrumed at one end and connected at its free end to a corresponding flexible element, a plurality of cam levers, one for each clutch actuating lever, a corresponding number of cams arranged on said driving shaft for imparting an oscillatory movement to said cam levers in overlapping succession, and means for transmitting the oscillatory movement from said cam levers to said clutch actuating levers.

9. In a transmission mechanism, a driving shaft, a driven shaft, a plurality of clutches separately connected to said driven shaft to drive it in one direction, a plurality of flexible elements, one in driving engagement with each clutch, a plurality of oscillatory clutch actuating members, each fulcrumed at one end and connected at its free end to a corresponding flexible element, a plurality of cam levers, one for each clutch actuating lever, a corresponding number of cams arranged on said driving shaft for imparting an oscillatory movement to said cam levers in overlapping succession, adjustable connections between said cam levers and said clutch actuating levers for transmitting the oscillatory movement to said clutch actuating levers, and means for adjusting said connections to alter the movement of said clutch actuating levers.

EINER W. LARSEN.